US009302460B2

(12) United States Patent
Chen et al.

(10) Patent No.: US 9,302,460 B2
(45) Date of Patent: Apr. 5, 2016

(54) THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/283,229

(22) Filed: May 21, 2014

(65) Prior Publication Data

US 2015/0290874 A1    Oct. 15, 2015

(30) Foreign Application Priority Data

Apr. 15, 2014    (TW) .............................. 103113685 A

(51) Int. Cl.
*B29C 67/00* (2006.01)
*B33Y 30/00* (2015.01)
*B29L 9/00* (2006.01)

(52) U.S. Cl.
CPC ............... *B33Y 30/00* (2014.12); *B29C 67/007* (2013.01); *B29C 67/0066* (2013.01); *B29L 2009/00* (2013.01)

(58) Field of Classification Search
None
See application file for complete search history.

(56) References Cited

U.S. PATENT DOCUMENTS

| 8,003,040 B2 * | 8/2011 | El-Siblani ..................... 264/401 |
| 8,348,655 B2 * | 1/2013 | Kuzusako et al. ......... 425/174.4 |
| 2005/0056913 A1 * | 3/2005 | Farnworth .................... 257/642 |

* cited by examiner

*Primary Examiner* — Jacob Thomas Minskey
(74) *Attorney, Agent, or Firm* — Jianq Chyun IP Office

(57) ABSTRACT

A three dimensional printing apparatus including a tank, a modeling platform, a first optical element, a second optical element, and a light source is provided. The modeling platform is movably disposed above the tank so as to move in or out the tank. The first and the second optical elements are respectively disposed next to the tank, wherein the second optical element is located above the first optical element. The light source is located below the tank. After a three dimensional object is formed on the modeling platform, the three dimensional object is moved out of the tank by the modeling platform. A first light generated by the light source is sequentially transmitted by the first and the second optical elements and detour round tank to irradiate the three dimensional object.

11 Claims, 4 Drawing Sheets

THREE DIMENSIONAL PRINTING APPARATUS

CROSS-REFERENCE TO RELATED APPLICATION

This application claims the priority benefit of Taiwan application serial no. 103113685, filed on Apr. 15, 2014. The entirety of the above-mentioned patent application is hereby incorporated by reference herein and made a part of this specification.

BACKGROUND OF THE DISCLOSURE

1. Technical Field

The disclosure relates to a printing apparatus, and more particularly to a three dimensional printing apparatus.

2. Description of Related Art

In the past few years, as the technology advances, many different technologies are used to build physical three-dimensional (3-D) models using additive manufacturing technology, for example, building a model layer by layer. Generally speaking, the additive manufacturing technology is to transfer data of the design of a 3D model, which is constructed by software, such as computer aided design (CAD), to multiple thin (quasi-two-dimensional) cross-sectional layers that are stacked in sequence. In the meantime, many techniques for forming thin cross-sectional layers are also proposed. For example, a printing module of a printing apparatus is usually configured to move above a base along an XY plane according to spatial coordinates XYZ constructed according to the design data of the 3D model, so as to use a construction material to form shapes of the cross-sectional shapes accurately. Then, the deposited construction material may be cured naturally or by heating or light irradiation to form the desired cross-sectional layers. By moving the printing module along the Z axis layer by layer, multiple cross-sectional layers can be gradually stacked along the Z axis, and while the construction material is cured layer by layer, a 3D object is formed.

Take the technology that forms 3D objects by curing the construction material with a light source as an example; the printing module is configured to be immersed in a liquid forming material in a container, and a light source module is disposed to irradiate the liquid forming material on the XY plane, so as to cure and stack the liquid forming material on a movable platform of the printing module. Accordingly, by moving the movable platform of the printing module layer by layer along the Z axis, the liquid forming material can be gradually cured layer by layer and stacked to form the 3D object. However, for the known 3D printing technology, after being formed, it is necessary for the 3D object to be moved to an exposure room of the device for performing the final curing irradiation so that the exterior surface of the 3D object may be fully cured, which inevitably requires more time for the formation of the 3D object. Meanwhile, the 3D object printing apparatus needs to be equipped with an additional room for performing the final curing, which consequently costs more in fabrication of the 3D printing apparatus and increases the appearance size thereof.

SUMMARY

The disclosure provides a three dimensional printing apparatus, and its light source may simultaneously perform initial modeling and final curing to a completed three dimensional object so as to expand the applicable range.

In the disclosure, the three dimensional printing apparatus includes a tank, a modeling platform, a first optical element, a second optical element, and a light source. The modeling platform is movably disposed above the tank so as to move in or out the tank. The first and the second optical elements are respectively disposed next to the tank, and the second optical element is located above the first optical element. The light source is located below the tank. After a three dimensional object is formed on the modeling platform, the three dimensional object is moved out of the tank by the modeling platform. A first light generated by the light source is sequentially transmitted by the first and the second optical elements and detours round the tank to irradiate the three dimensional object.

In an embodiment of the disclosure, the modeling platform moves in or out the tank along an axial direction, and the modeling platform rotates in the axial direction.

In an embodiment of the disclosure, the first optical element and the second optical element are respectively reflecting mirrors.

In an embodiment of the disclosure, the first light is sequentially transmitted by the first optical element and the second optical element to scan the three dimensional object along a first plane. The modeling platform moves out or in the tank along an axial direction, and the axial direction is a normal direction of the first plane.

In an embodiment of the disclosure, the modeling platform drives the three dimensional object to rotate in the axial direction and move back and forth along the axial direction so that the first light irradiates the entire surface of the three dimensional object.

In an embodiment of the disclosure, the tank is filled with a liquid forming material, and the three dimensional printing apparatus further includes a third optical element located below the tank. Meanwhile, a second light is generated by the light source and transmitted by the third optical element to pass through the bottom of the tank to scan the liquid forming material, so that the liquid forming material is cured to form the three dimensional object on the modeling platform.

In an embodiment of the disclosure, the third optical element is a reflecting mirror.

In an embodiment of the disclosure, the first optical element and the third optical element are integrally structured.

In an embodiment of the disclosure, the first optical element is located at one side of the third optical element away from the light source.

In an embodiment of the disclosure, the second optical element is an oscillating mirror.

In an embodiment of the disclosure, the first light is sequentially transmitted by the first optical element and the second optical element to irradiate the three dimensional object along a second plane. The modeling platform moves out or in the tank along an axial direction which is parallel with the second plane.

In an embodiment of the disclosure, the modeling platform drives the three dimensional object to rotate in the axial direction so that the first light irradiates the entire surface of the three dimensional object.

In an embodiment of the disclosure, the three dimensional printing apparatus is a stereolithography (SLA) three dimensional printing apparatus.

Based on the above, in the embodiments of the disclosure, the light source not only cures the liquid forming material to form the three dimensional object, with the configuration of the first optical element and the second optical element relative to the tank, the light source also generates the first light that is transmitted by the first and second optical elements and detours round the tank to irradiate the three dimensional object moved out of the tank, thereby performing final appearance curing irradiation to the formed three dimensional object. Accordingly, the three dimensional printing apparatus does not need to be equipped with an additional space and device to achieve the above mentioned final irradiation, thereby improving the fabrication efficiency of three dimensional printing and lowering the fabrication cost for the apparatus.

To make the aforementioned and other features and advantages of the disclosure more comprehensible, several embodiments accompanied with drawings are described in detail as follows.

DESCRIPTION OF EMBODIMENTS

Figures 1, 2:
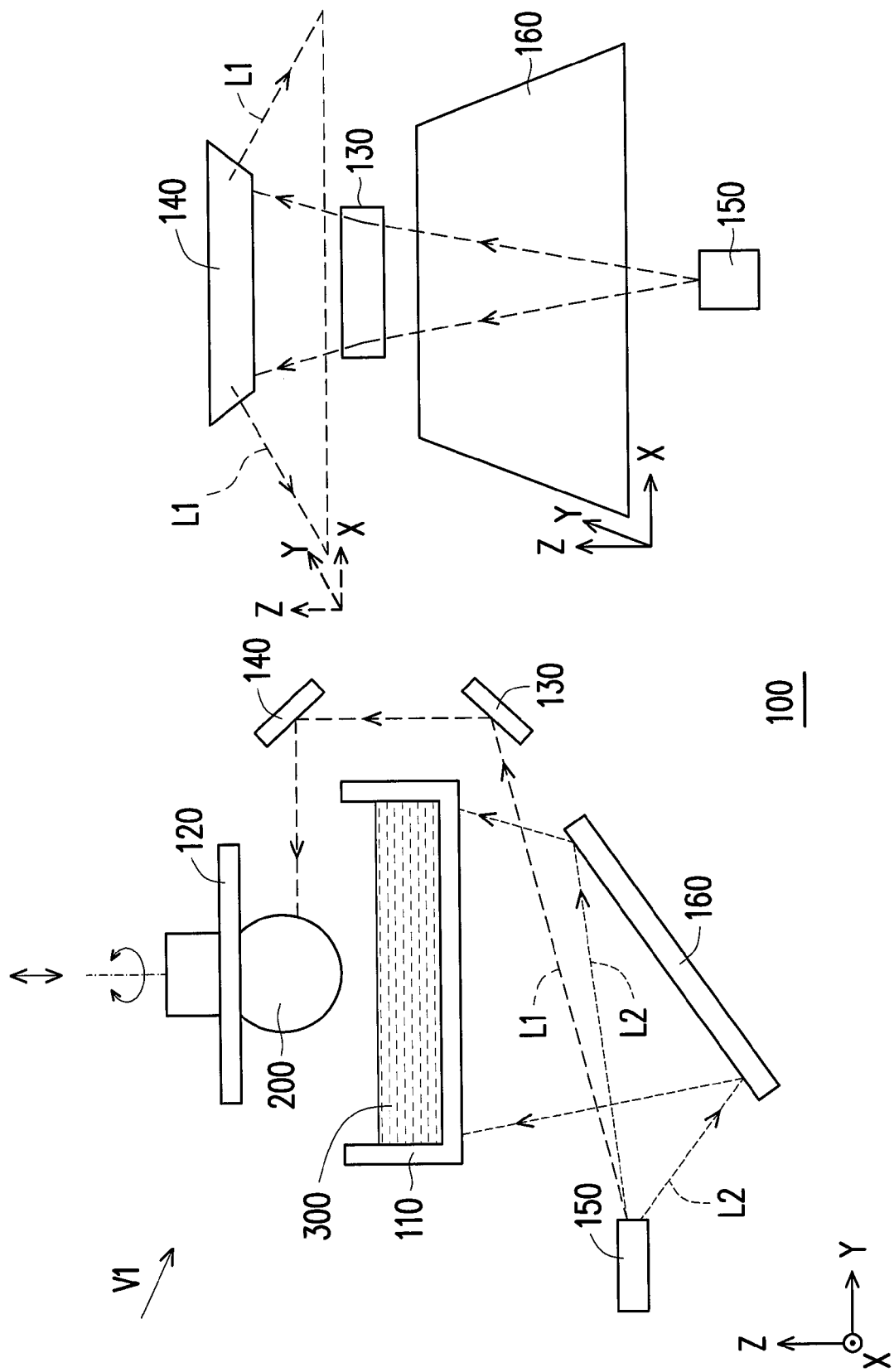
FIG. 1 is a side view illustrating a three dimensional printing apparatus according to an embodiment of the disclosure.
FIG. 2 shows a three dimensional printing apparatus according to FIG. 1 from another viewing angle.

FIG. 1 is a side view illustrating a three dimensional printing apparatus according to an embodiment of the disclosure. FIG. 2 shows a three dimensional printing apparatus according to FIG. 1 from another viewing angle. Please refer to both FIG. 1 and FIG. 2. In the embodiment, a three dimensional printing apparatus 100 is, for example, a stereolithography (SLA) three dimensional printing apparatus which includes a tank 110, a modeling platform 120, a first optical element 130, a second optical element 140, a light source 150, and a third optical element 160. The tank 110 is filled with a liquid forming material 300. The modeling platform 120 is controlled by a controller (not shown) and is movably disposed on the tank 110, so that the modeling platform 120 may move back and forth along a Z axis to achieve the movement status of moving the tank 110 in or out and the liquid forming material 300 therein. The light source 150 and the third optical element 160 are disposed below the tank 110, wherein the third optical element 160 is, for example, a reflecting mirror. The light source 150 generates a second light L2 which is transmitted by the third optical element 160 to be reflected towards the bottom of the tank 110, and passes through the tank 110 to irradiate the liquid forming material 300 between the modeling platform 120 and the tank 110. Since the liquid forming material 300 is, for example, a photosensitive resin, and the light source 150 generates the light (such as an ultraviolet) that may cure the photosensitive resin, with the scanning characteristics of the second light L2 and the reflecting effect provided by the third optical element 160, the second light L2 may perform scanning to cure the liquid forming material 300 layer by layer on the modeling platform 120. Finally, a three dimensional object 200 may be formed on the modeling platform 120.

Figure 3:
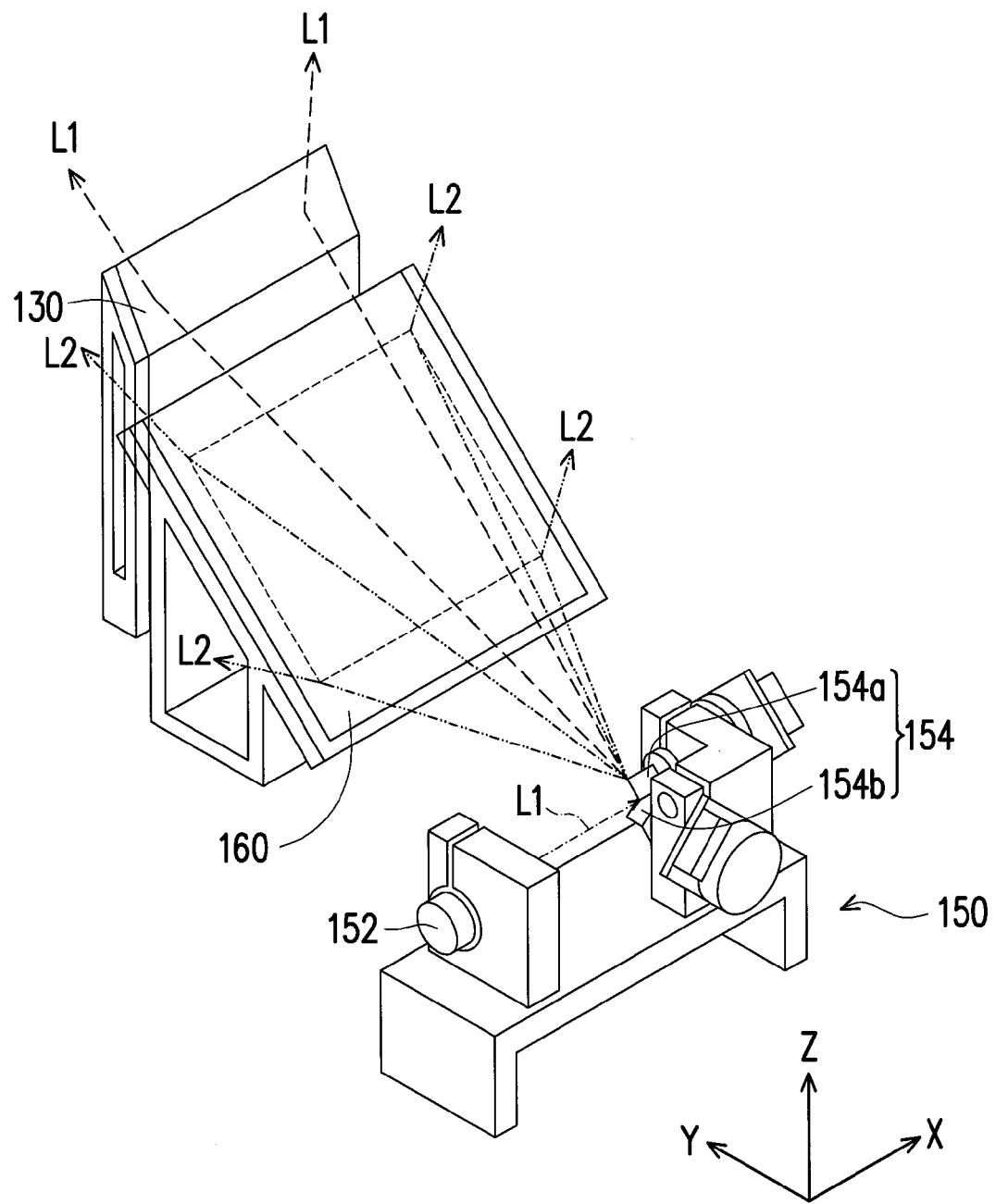
FIG. 3 is a schematic three dimensional view illustrating partial components of the three dimensional printing apparatus according to FIG. 1.

First, the method for forming the three dimensional object is described as follows. FIG. 3 is a schematic three dimensional view illustrating partial components of the three dimensional printing apparatus according to FIG. 1. Please refer to both FIG. 1 and FIG. 3. In the embodiment, the light source 150 includes a light emitting element 152 and an oscillating mirror module 154, wherein the light emitting element 152 is, for example, an ultraviolet laser light source, which should not be construed as a limitation to the disclosure. The oscillating mirror module 154 is formed of two oscillating mirrors 154a and 154b, and one of the oscillating mirrors 154a and 154b is driven by a motor (not shown) so as to drive the second light L2 generated by the light emitting element 152 to scan back and forth along an X-axis direction. The other one of the oscillating mirrors 154a and 154b is also driven by a motor (not shown) so as to drive the second light L2 generated by the light emitting element 152 to scan back and forth along a Y-axis direction. Accordingly, the second light L2 may perform scanning within a specific range (see the dash-lined frame drawn on the third optical element 160 as shown in FIG. 3) of the third optical element 160 via the oscillating mirror module 154, and the specific range includes the bottom of the tank 110. In that case, the three dimensional printing apparatus 100 may control the scan range of the second light L2 on the modeling platform 120 via the controller, and cure the liquid forming material 300 to form the three dimensional object 200 layer by layer with a desired outline.

Please also refer to FIGS. 1-3. After the three dimensional object is formed, the modeling platform 120 is controlled by the controller to move the three dimensional object 200 out of the tank 110. In the embodiment, the first optical element 130 and the second optical element 140 of the three dimensional printing apparatus 100 are, for example, reflecting mirrors which are respectively disposed next to the tank 110. The first optical element 130 is disposed at one side of the third optical element 160 away from (opposite to) the light source 150. The second optical element 140 is located above the first optical element 130. Accordingly, when the three dimensional object 200 is moved out of the tank 110 to be located above the tank 110, the light source 150 may be controlled by the controller to generate the first light L1 having a different emitting angle from that of the second light L2, and allows the first light L1 to be sequentially transmitted by the first optical element 130 and the second optical element 140 to detour round the tank 110 and irradiate the three dimensional object 200, thereby performing final curing irradiation on the three dimensional object 200.

Specifically, please also refer to FIG. 2, which is illustrated based on a viewing angle V1 according to FIG. 1. Please note that, since the light source 150, the first optical element 130, and the second optical element 140 are located at different height along the Z axis, the three dimensional viewing angle of FIG. 2 will be described based on the three dimensional coordinates drawn by solid lines and the three dimensional coordinates drawn by dashed lines respectively.

In the embodiment, as mentioned above, the first light L1 generated by the light emitting element 152 becomes the first light L1 scanning within a specific range after being transmitted by the oscillating mirror module 154. Therefore, when being reflected sequentially by the first optical element 130 and the second optical element 140, the first light L1 substantially scan the three dimensional object along an X-Y plane. That is, at the time, the outline generated by the first light L1 irradiating the three dimensional object 200 is shown as a straight light along the X axis. Here, the X-Y plane is defined as a first plane. Therefore, the axial direction (Z axis) that the controlled modeling platform moves along is a normal direction of the first plane. Accordingly, the modeling platform 120 needs to be controlled by the controller to move back and forth along the Z axis while rotating in the Z axis so that the first light L1 to irradiates the entire surface of the three dimensional object 200.

Figure 4:
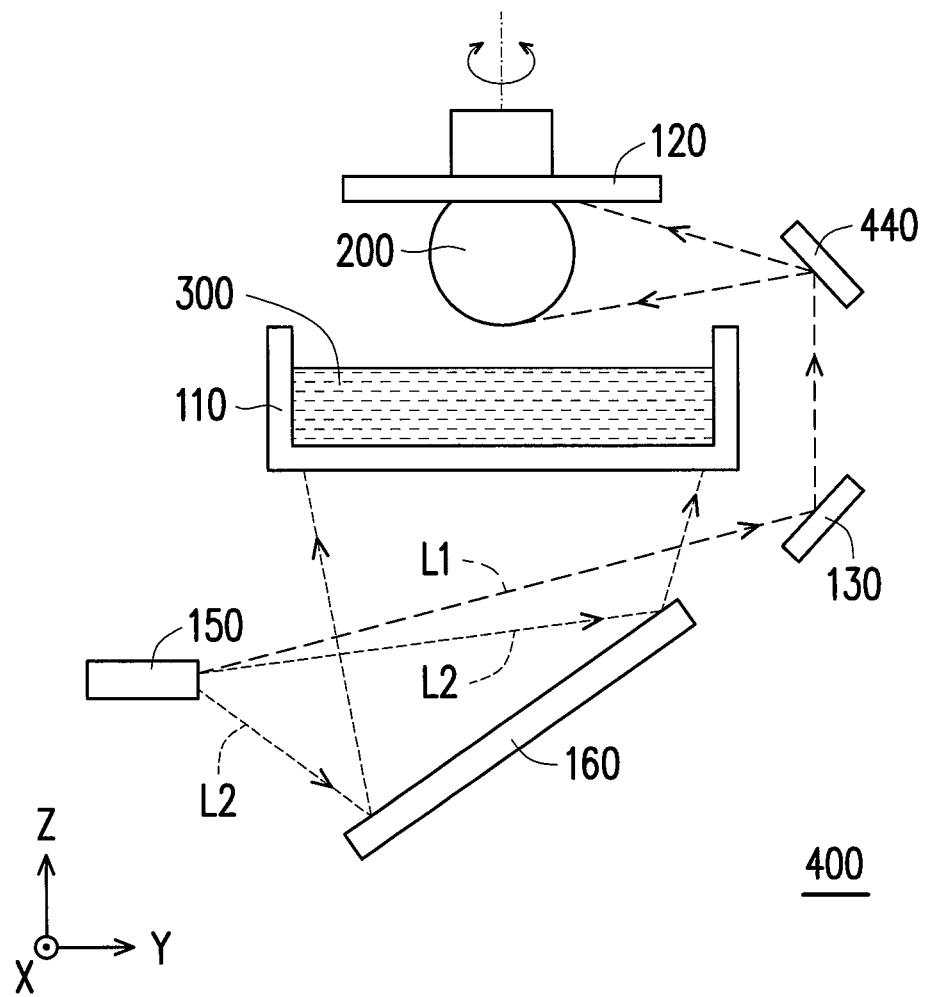
FIG. 4 is a side view illustrating a three dimensional printing apparatus according to another embodiment of the disclosure.

FIG. 4 is a side view illustrating a three dimensional printing apparatus according to another embodiment of the disclosure. Different from the above embodiment, a second optical element 440 of a three dimensional printing apparatus 400 is an oscillating mirror, which is similar to the above oscillating mirrors 154a and 154b. However, the second optical element 440 of the embodiment generates a first light L1 which scans along a Y-Z plane, that is, an oscillating axis of the second optical element 440 is the X axis. In other words, as the scan range of the first light L1 reflected by the second optical element 440 is defined as the second plane, the axial direction (Z axis) which the controlled modeling platform 120 moves along is parallel with the second plane. Accordingly, the outline generated by the first light L1 irradiating the three dimensional object 200 is shown as a straight line along the Z axis. At the time, the modeling platform 120 is simply controlled by the controller to rotate in the Z axis so that the first light L1 irradiates the entire surface of the three dimensional object 200.

Figure 5:
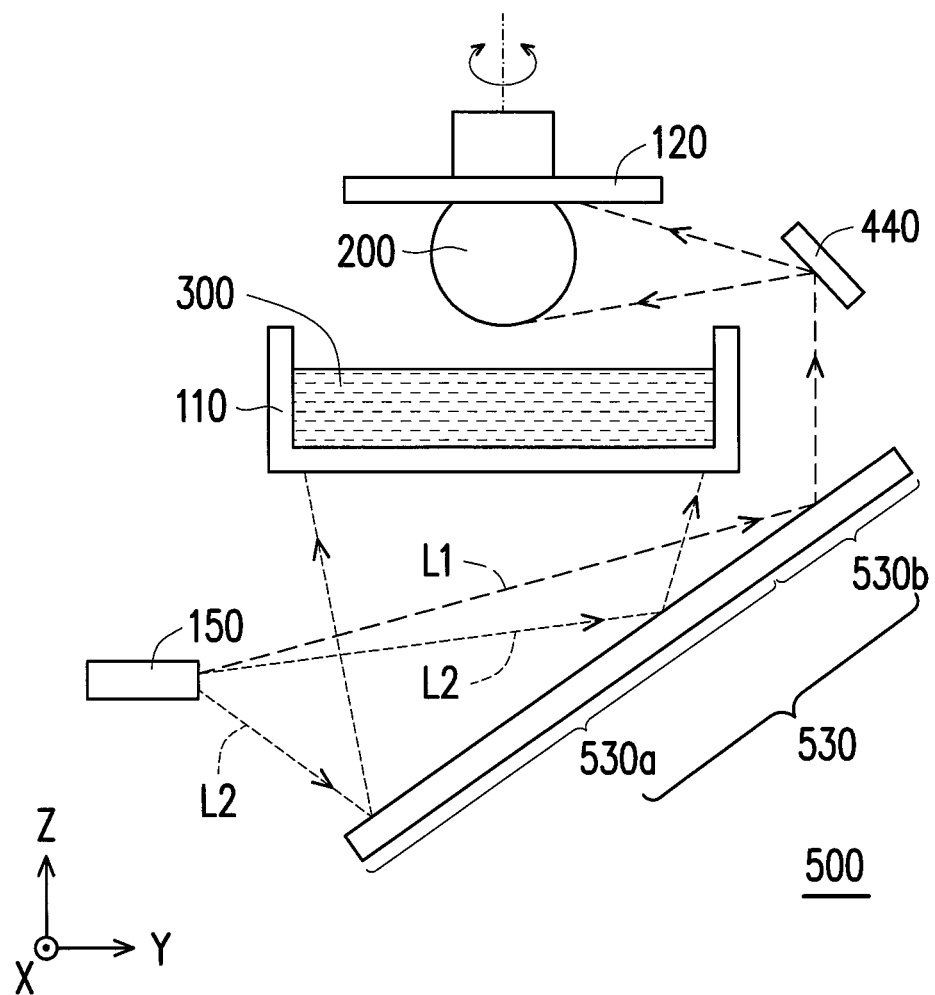
FIG. 5 is a side view illustrating a three dimensional printing apparatus according to another embodiment of the disclosure.

FIG. 5 is a side view illustrating a three dimensional printing apparatus according to another embodiment of the disclosure. Different from the previous embodiment, in a three dimensional printing apparatus 500 of the embodiment, the first optical element and the third optical element are integrally formed as a reflecting mirror 530, which is divided into reflecting surfaces 530a and 530b respectively (to avoid a complicated drawing of lines, the reflecting surfaces 530a and 530b are labeled at the rear side of the reflecting mirror 530, but the reflection actually takes place at where the light L1 and light L2 are reflected as shown in the drawing). The reflecting surface 530a is substantially located right below the tank 110 so that the second light L2 generated by the light source 1150 may scan on the modeling platform 120 after being transmitted by the reflecting surface 530a for curing the liquid forming material 300. The reflecting surface 530b is substantially located outside the orthographic projection of the tank 110 projected on the reflecting mirror 530, i.e. located at the opposite side of the reflecting surface 530a (away from) the light source 150 so that the first light L1 generated by the light source 150 may be reflected on the second optical element 440 after being transmitted by the reflecting surface 530b. Moreover, the second optical element 440 in the embodiment is the same as shown in the embodiment of FIG. 4; therefore, no further descriptions are incorporated herein.

Based on the above, in the embodiments of the disclosure, with different configurations of optical elements of the three dimensional printing apparatus, the light source cures the liquid forming material to form the three dimensional object. Also, with configuration of the first optical element and the second optical element relative to the tank, the light source may generate the first light that does not cure the liquid forming material; after being transmitted by the first and the second optical elements to detour round the tank and irradiate the three dimensional object moved out of the tank, the first light performs final appearance curing irradiation to the formed three dimensional object.

In addition, as the form of the second optical element changes adaptively, the first light may scan the three dimensional object outside the tank along different planes (such as the first plane or the second plane) so that the modeling platform operates under different movement statuses, allowing the entire surface of the three dimensional object to be irradiated by the first light and fully cured.

Accordingly, the three dimensional printing apparatus does not need to be equipped with an additional space and devices to achieve the above-mentioned final irradiation, and therefore the fabrication efficiency of three dimensional printing may be improved and the fabrication cost for the apparatus may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three dimensional printing apparatus, comprising:
a tank filled with a liquid forming material;
a modeling platform moveably disposed above the tank to move in or out the tank;
a first optical element and a second optical element respectively disposed next to the tank, and the second optical element located above the first optical element;
a third optical element located under the tank; and
a light source located below the tank, wherein, when a three dimensional object is formed at the modeling platform, the modeling platform moves the three dimensional object out of the liquid forming material in the tank, and the light source generates a first light sequentially transmitted by the first optical element and the second optical element to detour round the tank to irradiate the three dimensional object to perform a final appearance curing irradiation to the formed three dimensional object,
wherein the light source generating a second light transmitted by the third optical element to pass through a bottom of the tank and scan the liquid forming material to cure the liquid forming material so as to form the three dimensional object on the modeling platform,
wherein the first optical element is located at a side of the third optical element away from the light source and out of an area under the tank.

2. The three dimensional printing apparatus according to claim 1, wherein the modeling platform moves out or in the tank along an axial direction, and the modeling platform rotates in the axial direction.

3. The three dimensional printing apparatus according to claim 1, wherein the first optical element and the second optical element are respectively a reflecting mirror.

4. The three dimensional printing apparatus according to claim 3, wherein the first light is sequentially transmitted by the first optical element and the second optical element to scan the three dimensional object along a first plane, and the modeling platform moves out or in the tank along an axial direction which is a normal direction of the first plane.

5. The three dimensional printing apparatus according to claim 4, wherein the modeling platform drives the three dimensional object to rotate in the axial direction and move back and forth along the axial direction so that the first light irradiates an entire surface of the three dimensional object.

6. The three dimensional printing apparatus according to claim 1, wherein the third optical element is a reflecting mirror.

7. The three dimensional printing apparatus according to claim 1, wherein the first optical element and the third optical element are integrally structured.

8. The three dimensional printing apparatus according to claim 1, wherein the second optical element is an oscillating mirror.

9. The three dimensional printing apparatus according to claim 8, wherein the first light is sequentially transmitted by the first optical element and the second optical element to irradiate the three dimensional object along a second plane, and the modeling platform moves out or in the tank along an axial direction which is parallel with the second plane.

10. The three dimensional printing apparatus according to claim 9, wherein the modeling platform drives the three dimensional object to rotate in the axial direction so that the first light irradiates an entire surface of the three dimensional object.

11. The three dimensional printing apparatus according to claim 1, wherein the three dimensional printing apparatus is a stereolithography (SLA) three dimensional printing apparatus.

* * * * *